No. 690,874. Patented Jan. 7, 1902.
J. POWERS.
BREAD OR CAKE BOX.
(Application filed Apr. 10, 1901.)
(No Model.) 2 Sheets—Sheet 1.
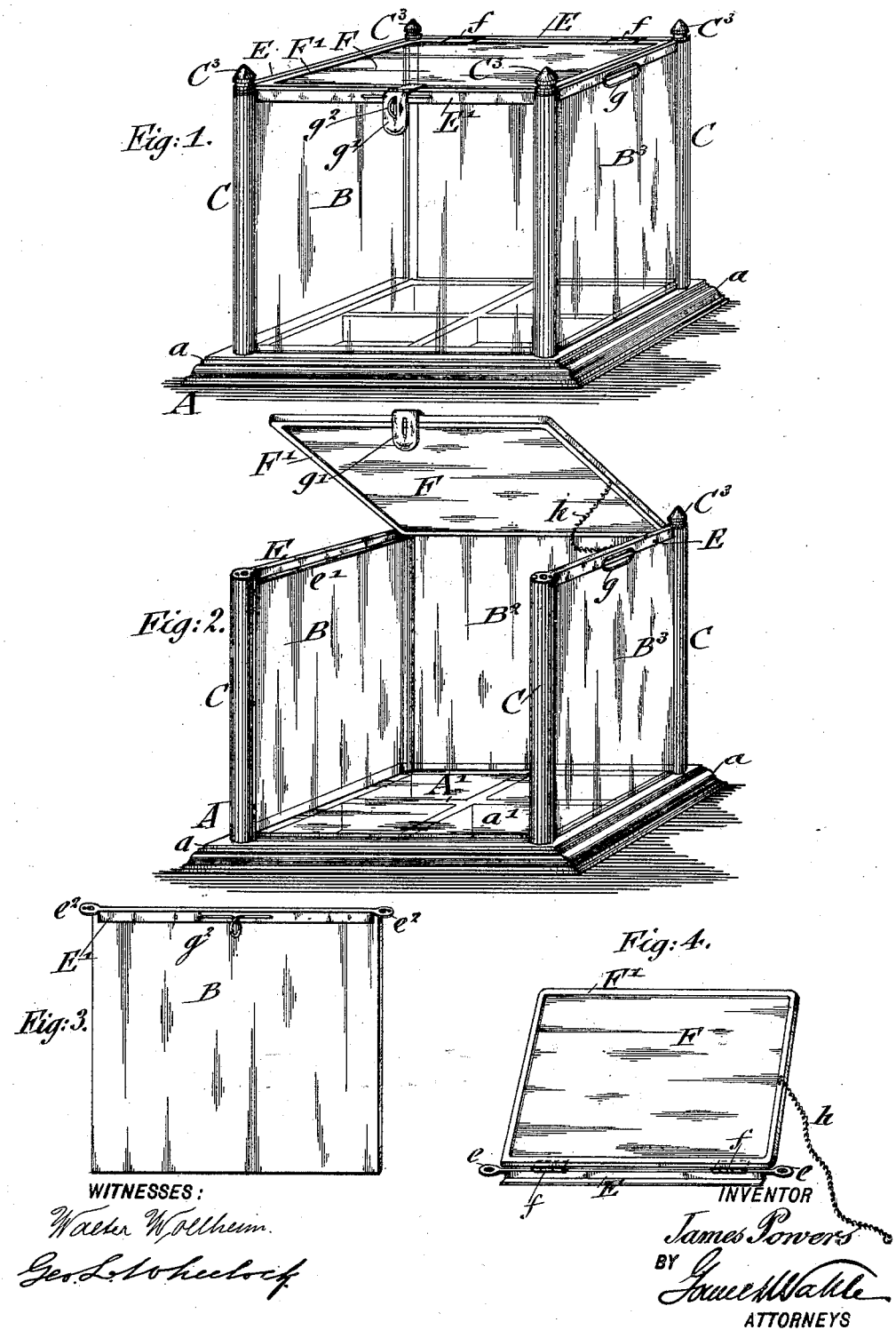
WITNESSES: INVENTOR
James Powers
BY
ATTORNEYS No. 690,874. Patented Jan. 7, 1902.
J. POWERS.
BREAD OR CAKE BOX.
(Application filed Apr. 10, 1901.)
(No Model.) 2 Sheets—Sheet 2.
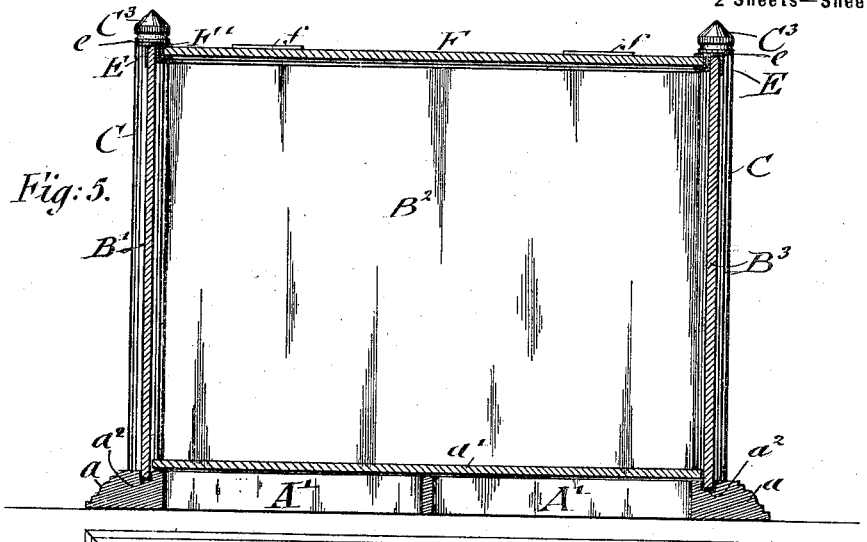
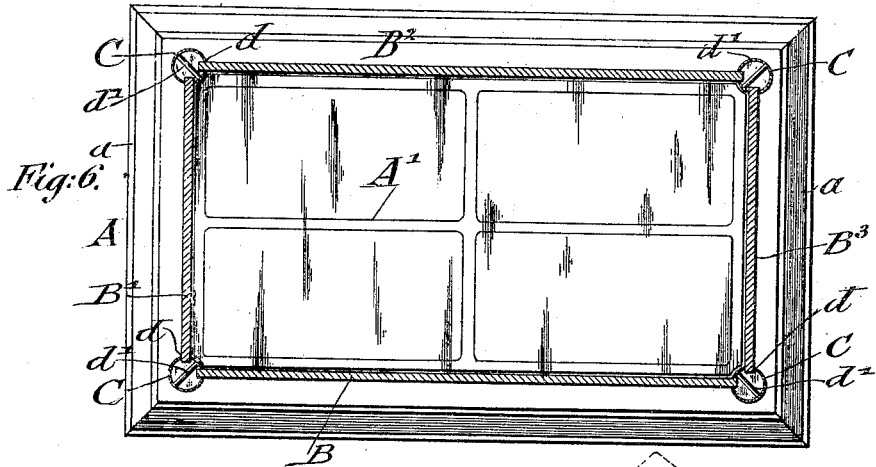
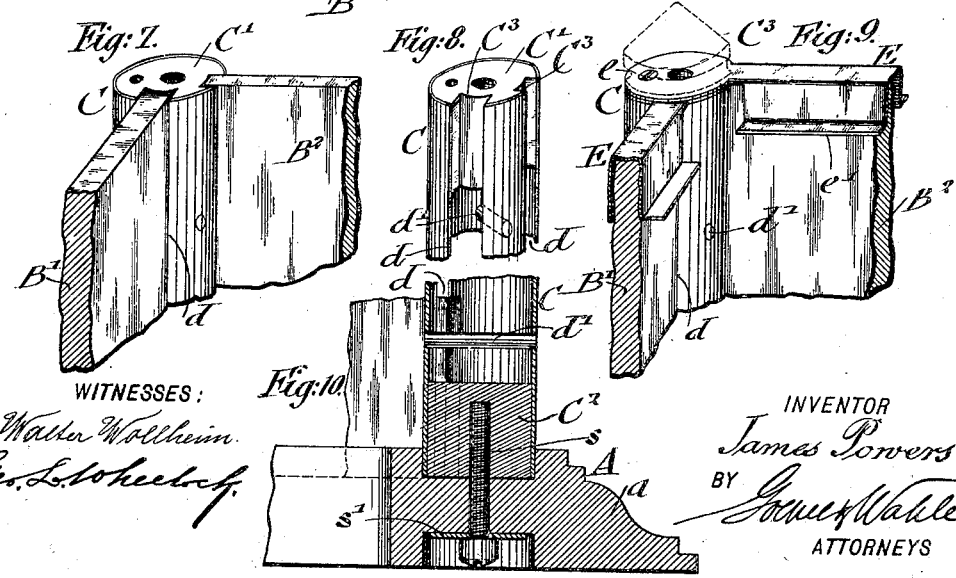
WITNESSES:
INVENTOR
James Powers
BY
ATTORNEYS

UNITED STATES PATENT OFFICE.

JAMES POWERS, OF NEW YORK, N. Y., ASSIGNOR OF ONE-HALF TO NAHUM I. STONE, OF NEW YORK, N. Y.

BREAD OR CAKE BOX.

SPECIFICATION forming part of Letters Patent No. 690,874, dated January 7, 1902.

Application filed April 10, 1901. Serial No. 55,167. (No model.)

*To all whom it may concern:*

Be it known that I, JAMES POWERS, a citizen of the United States, residing in New York, borough of Manhattan, in the State of New York, have invented certain new and useful Improvements in Bread or Cake Boxes, of which the following is a specification.

This invention relates to an improved box for keeping bread and cake and other articles of food in good and moist condition, and which is constructed of glass and metal in such manner that it can be conveniently cleaned from time to time and the top, bottom, and sides replaced in case of breakage.

The invention consists of a bread and cake box which comprises a base, side walls, corner-posts for the side walls, retaining top frames connecting the upper ends of the posts and provided with overlapping eyes, a lid resting on ledges of said top frames, and screw knobs or fastenings passing through said eyes and into the upper ends of the posts for retaining the top frame in position, all as will be fully described hereinafter and finally pointed out in the claims.

In the accompanying drawings, Figure 1 represents a perspective view of my improved bread and cake box. Fig. 2 is a perspective view of the body of the box with the front wall removed. Figs. 3 and 4 are respectively details of the detachable front wall and lid. Fig. 5 is a vertical longitudinal section of the box. Fig. 6 is a horizontal section of the same; and Figs. 7, 8, 9, and 10 are details showing, respectively, the connections of the corner-posts with the glass side walls, the construction of an individual corner-post, the means for connecting the posts with the top frame of the box, and the means for connecting the corner-posts with the base or the bottom of the box.

Similar letters of reference indicate corresponding parts.

Referring to the drawings, A represents the base-frame of my improved bread and cake box. The base-frame A is provided with an exterior molding $a$ and an interior skeleton frame A', on which the bottom glass plate $a'$ is supported. The bottom frame A is provided with grooves $a^2$, in which are inserted the glass plates B B' B$^2$ B$^3$, which form the side walls of the box, said side walls being supported in longitudinal slots $d$ of tubular corner-posts C, which are attached to the base-frame at their lower ends, which are preferably made of aluminium for the sake of lightness. The corner-posts C are made tubular or of other shape and are provided with stay-pins $d'$, that connect the outer larger portion of each tube with the inner portion of the same, as shown in Figs. 6 and 10. The tubular corner-posts are provided at their upper and lower ends with cylindrical filling-pieces C' C$^2$, respectively, made of cast-iron or other suitable metal, which are recessed at C$^3$ in line with the slots $d$ in the posts, so as to receive the glass side walls B B' B$^2$ B$^3$ of the box. The bottom filling-pieces C$^2$ are connected by fastening-screws $s$ with washers $s'$, seated in smooth recesses of the bottom frame A, while the top filling-pieces C' are provided with centrally-threaded sockets for receiving the screw-shanks of the knobs C$^3$, which pass through eyes $e$ in the metallic top frames E of the side walls. Said top frames are bent up into U shape in cross-section, so that the upper edges of the side walls may fit therein.

The retaining top frames E of the side walls of the box are provided with interior ledges $e'$, which are located below the upper edges of the frames, so as to support the lid F, which is also made of glass and provided with a sheet-metal edge frame F' around the same, said edge frame being connected by hinges $f$ to the top frame E of the rear wall B$^2$, as shown in Fig. 1. The top frames are provided with hinged handles $h$, by which the box can be readily lifted and carried. The front part of the frame of the lid F is provided with a hasp $g'$, so that the lid can be fastened to an eye or staple $g^2$ at the front of the U-shaped frame E' of the glass front wall B, which frame E' is provided with horizontal perforated eyes $e^2$ at the ends, that fit over the corresponding eyes of the top frames E, and which eyes are secured by the screw-knobs C$^3$ to the filling-pieces C' at the upper ends of the front posts, as shown in Fig. 1 and in the same manner as shown in Fig. 9. The lid F is connected by a chain $h$ with the interior ledge of the top frame, so as to be stayed against tilting back too far.

The front wall B is detached by removing the front screw-knobs $C^3$, so that the front wall can be lifted out of the guide-slots $d$ of the front posts C, whereby the box may be conveniently cleaned, after which the front wall is replaced and the screw-knobs $C^3$ screwed into the horizontal eyes $e^2$ of the frame E at its upper end. If one of the glass plates forming the side walls $B'$ $B^2$ $B^3$ should be broken, it can be readily replaced by detaching the side or top frames E and substituting another glass plate.

My improved bread and cake box forms quite an ornamental structure, especially when decorated glass plates are employed. As the corner-posts are preferably made of aluminium, the box is made lighter in weight than if heavier metal were used. The box forms a receptacle in which bread and cake can be stored so as to be protected against dust. The box can also be made up in a more expensive style by using beveled glass plates for the sides and top, in which case the corner-posts may be made of nickeled or silver-plated metal. As the lid fits tightly on the interior ledges of the frames and within the frames of the side, front, and rear walls, a tight fit is obtained, so that the moisture is retained in the bread and cake stored in the box.

Having thus described my invention, I claim as new and desire to secure by Letters Patent—

1. A bread and cake box, consisting of a suitable base, corner-posts attached to said base, side walls suitably guided on said posts and provided with top frames having overlapping eyes and interior ledges, screw-knobs passing through said eyes and fastening the top frames to the posts and a lid resting on said ledges, substantially as set forth.

2. A bread and cake box, consisting of a suitable base, tubular sheet-metal corner-posts attached to the base, filling-pieces inserted into the upper ends of the posts, side walls provided with top frames at their upper ends, said top frames having horizontal eyes, a lid hinged to the top frame of the rear wall, screw knobs or fastenings connecting the eyes of the top frames with the upper ends of the corner-posts, ledges at the lower inner edges of the top frames for supporting the hinged lid, and means for attaching the hinged lid to the front frame of the box, substantially as set forth.

3. In a bread and cake box, the combination of a suitable base, side walls, said base being provided with grooves for receiving the side walls of the box, corner-posts provided with filling-pieces at their upper and lower ends, said corner-posts being attached to said base, and said side walls being guided in the corner-posts, and provided with metallic frames at their upper ends, said frames having horizontal overlapping eyes, a lid provided with a metallic edge frame, hinged to the top frame of the rear wall, the said top frames being provided with interior ledges for supporting said lid, and screw-knobs passing through the central openings of the eyes into the filling-pieces at the upper ends of the corner-posts, for holding the corner-posts in position, substantially as set forth.

In testimony that I claim the foregoing as my invention I have signed my name in presence of two subscribing witnesses.

JAMES POWERS.

Witnesses:
PAUL GOEPEL,
GEORGE GEIBEL.